United States Patent [19]

Mears

[11] 3,779,899

[45] Dec. 18, 1973

[54] HYDROGENATION OF AROMATIC HYDROCARBONS

[76] Inventor: David E. Mears, 212 Lido Pl., Fullerton, Calif.

[22] Filed: May 3, 1971

[21] Appl. No.: 139,924

[52] U.S. Cl.............................. 208/143, 260/667
[51] Int. Cl............................................ C10g 23/04
[58] Field of Search..................... 208/143, DIG. 2; 260/667

[56] References Cited
UNITED STATES PATENTS

| | | | |
|---|---|---|---|
| 3,527,695 | 9/1970 | Lawrance et al. | 208/143 |
| 3,140,253 | 7/1964 | Plank et al. | 208/143 |
| 3,197,398 | 7/1965 | Young | 208/143 |
| 3,367,885 | 2/1968 | Rabo et al. | 252/455 Z |

*Primary Examiner*—Herbert Levine
*Attorney*—Milton W. Lee, Richard C. Hartman, Lannas S. Henderson, Dean Sanford and Robert E. Strauss

[57] ABSTRACT

Aromatic hydrocarbons, particularly monocyclic hydrocarbons, are hydrogenated without substantial hydrocracking in the presence of a catalyst prepared by impregnating or ion-exchanging platinum onto a previously stabilized Y zeolite base, followed by drying and calcining at temperatures above 1,000° F. The final, high-temperature calcination gives markedly improved hydrogenation activity as compared to calcination at lower temperatures.

5 Claims, No Drawings

HYDROGENATION OF AROMATIC HYDROCARBONS

BACKGROUND AND SUMMARY OF INVENTION

There is today in the petroleum industry a steadily increasing demand for relatively non-aromatic middle distillate products boiling in the range of about 300°–700° F. Such products include for example aviation turbine fuels, diesel fuels, solvents and the like. Products in this boiling range are conventionally produced by the hydrotreating and/or hydrocracking of various refinery streams boiling in or above the desired product range. Hydrotreating and hydrocracking operations generally effect a substantial partial hydrogenation of polycyclic aromatics, but the final products still contain a relatively high percentage of mono-aromatic hydrocarbons. Further hydrogenation of these products is desired in many cases to produce acceptable solvent products, to meet specifications (smoke point and luminometer number) for jet fuels, etc.

Also, with the advent of lead-free gasolines, there is a growing need for high-octane hydrocarbons boiling in the gasoline range. This need cannot be satisfied entirely by increased catalytic reforming capacity, which is useful primarily for upgrading the heavier gasoline fractions by aromatization. The light gasoline fraction boiling in the $C_5$-$C_6$ range is composed mainly of paraffins which are not appreciably affected by catalytic reforming. To obtain maximum octane values in the light gasoline fractions it is necessary to resort to isomerization processes to convert n-pentane and n-hexane to iso-paraffins, or to convert normal butane to iso-butane for alkylation purposes. Low temperature isomerization of $C_5$ and $C_6$ paraffins is particulary desirable because the equilibrium favors iso-paraffins at the lower temperatures. However, at these low temperatures (e.g., 200°–300° F.) conventional platinum-promoted, acidic isomerization catalysts are very sensitive to minor amounts of benzene present in the feed (which cannot readily be separated therefrom due to the hexane-benzene azeotrope). It is therefore essential in such isomerization processes to carry out a substantially complete hydrogenation of the benzene in such feeds before they contact the isomerization catalyst.

The best catalysts developed to date for hydrogenating aromatic hydrocarbons consist of platinum impregnated onto various alumina or alumina-silica supports. Conventional platinum-alumina reforming catalysts are sometimes used. Also, U.S. Pat. No. 3,527,695 describes a hydrogenation catalyst consisting of palladium supported on a decationized Y zeolite, the final catalyst being calcined in hydrogen at temperatures below 500° C. (932° F.). I have now discovered that catalysts of much superior activity to any of the foregoing are obtained by impregnating or ion-exchanging platinum into an acidic, stabilized Y zeolite support, and then drying and calcining the resulting composite at temperatures above 1,000° F., preferably above 1,100° F. The high-temperature calcination appears to be the critical factor; catalysts calcined at 1,200° F. for example are found to display a hydrogenation activity at least 100 percent greater than that of analogous catalysts calcined at or below 1,000° F. The reason for this phenomenon is somewhat uncertain, but is believed attributable in some degree at least to the conversion of Bronsted acidity sites on the catalysts to Lewis acidity sites, which more strongly adsorb aromatic hydrocarbons. In addition to improving the hydrogenation activity, the high-temperature calcination also appears to reduce the cracking activity of the catalyst.

In order to utilize successfully the high-temperature calcination technique, it is necessary that the Y zeolite base be in a thermally stable condition prior to the addition of platinum thereto. Suitably stable forms of Y zeolite include those containing stabilizing polyvalent metal ions, or the hydrogen and/or decationized forms which have been stabilized by high-temperature steam treatments to be described hereinafter. The decationized and/or hydrogen forms of Y zeolite prepared by the conventional procedures described for example in U.S. Pat. No. 3,130,006 begin to lose crystallinity at temperatures above about 1,000° F., and this loss in crystallinity proceeds rapidly at temperatures above 1,100° F. Suitable steam-stabilizing treatments for preventing such loss in crystallinity are described for example in U.S. Pat. Nos. 3,354,077 and 3,293,192. It should be noted that the final high-temperature calcination employed herein gives marked improvement in activity even though the steam stabilization pretreatment applied to the zeolite base before addition of platinum may have been carried out at temperatures as high or higher than that of the final calcination.

DETAILED DESCRIPTION

A. Zeolite Bases

The operative Y zeolite bases for use herein are those wherein a substantial portion of the original zeolitic sodium ions have been replaced by ion exchange with other cations which contribute acidity and/or stability to the zeolite. The final sodium content should be less than 3 weight-percent (as $Na_2O$), preferably less than 1.5 percent. The unique activity of the catalysts depends firstly upon replacing a substantial portion, i.e., at least about 20 percent, and preferably at least about 40 percent of the original zeolitic sodium ions with hydrogen ions. These hydrogen ion-exchange sites constitute Bronsted acidity, and during the final high-temperature calcination step a substantial portion of such exchange sites undoubtedly become decationized, forming Lewis acid sites. This mechanism of decationization is sometimes referred to in the art as "dehydroxylation," and is accompanied by a loss in weight due to water loss. Maximum hydrogenation activity is obtained when at least about 50 percent, and preferably at least 80 percent of the original ion exchange sites are converted in the final catalyst to decationized sites and/or hydrogen ion sites.

Methods for introducing hydrogen ions into Y zeolites are now well known in the art. The conventional procedure is to subject the original sodium zeolite to ion exchange with an aqueous solution of an ammonium salt, e.g., the nitrate, chloride or sulfate, to form an ammonium zeolite. The zeolitic ammonium ions are then decomposed during subsequent heating steps, forming ammonia and hydrogen ion exchange sites. Where only minimal acidity is desired, direct exchange with aqueous acids can be carried out to the extent of replacing about 10 to 20 percent of the sodium with hydrogen ions. Further direct exchange with acids tends to destroy the crystal structure of the zeolite.

As noted above, the high temperature final calcination step requires a thermally stable form of the zeolite. Thermal stability up to temperatures of about 1,500°–1,800° F. may be obtained by two general procedures, or a combination of both. Firstly, after replacing at least about 80 percent, and preferably at least about 90 percent of the original sodium ions with ammonium ions, the resulting ammonium zeolite may be partially back-exchanged with solutions of polyvalent metal salts to replace from about 10–80 percent, preferably 20–50 percent of the ammonium ions with an ionic equivalent of polyvalent metal ions. The resulting mixed polyvalent metal ammonium zeolites may then be dried and calcined at temperatures of, e.g., 700° to 1,500° F. to produce a stable polyvalent metal-hydrogen zeolite. Suitable polyvalent metal ions include those of the metals of Groups IIA, IIIA, IIB, VIIB and VIII, as well as the rare earth metals. Preferred polyvalent metal cations comprise magnesium, calcium, nickel, zinc and the rare earth metals, e.g., cerium, lanthanum, praseodymium, neodymium, samarium, etc.

To achieve maximum activity and stability however, it is normally preferable to convert substantially all of the exchange sites to decationized and/or hydrogen ion sites. Zeolite bases of this nature are prepared by exhaustive exchange of the original sodium ions with ammonium ions, followed by a special hydrothermal treatment to effect stabilization. Maximum activity is obtained from zeolite bases wherein the sodium content has been reduced to less than 1.5 weight-percent $Na_2O$, preferably less than 0.5 percent. The hydrothermal stabilization treatment consists essentially in heating the ammonium ion exchanged zeolite in a steam atmosphere at temperatures of about 900° – 1,500° F. for times ranging between about 30 minutes and 12 hours or more. A single such stabilization treatment produces a very acceptable zeolite base, but even better results are obtained by subjecting the once-stabilized zeolite to further ammonium ion-exchange to reduce the sodium content even further, and then subjecting it to a second hydrothermal treatment of the same nature. The first hydrothermal treatment effects a redistribution of difficultly exchangeable sodium ions remaining after the initial ammonium ion exchange, such that the final sodium content can be reduced to very low levels of, e.g., 0.1 weight-percent $Na_2O$ or less.

The mechanism of hydrothermal stabilization is not completely understood, but appears to involve removal of aluminum atoms from the anionic crystal lattice structure, with a resultant increase in the $SiO_2/Al_2O_3$ mole-ratio of the structure. Removal of aluminum atoms also brings about a shrinkage in the unit cell size of the zeolite crystals, and this reduction in cell size is a fairly reliable indicia of the stability achieved. The smaller the unit cell size the greater the stability as a general rule. The unstabilized hydrogen Y zeolite normally displays a unit cell size of about 24.65 A. Some degree of stabilization is indicated by a unit cell size of 24.60 A, but for maximum stability the cell size should be reduced to between about 24.20 and 24.55 A, preferably 24.30 – 24.50 A. The $SiO_2/Al_2O_3$ mole ratio of such zeolites ranges between about 5.0 and 8.0.

The zeolite base may be formed into the shape desired for the final catalyst either before or after the addition of platinum. Typical procedures consist of compressing the powdered material into pellets in a tableting machine, subjecting the moistened powder to prilling, extrusion or the like. Prior to these operations it is normally desirable to admix with the zeolite base about 10–30 weight-percent of a suitable inorganic binder such as clays, alumina gel, alumina-silica cogels, or the like.

B. Addition of Platinum

Platinum is added to the zeolite base by conventional procedures such as impregnation with aqueous solutions of salts of platinum, or preferably by ion exchange with aqueous solutions of platinum compounds wherein the platinum appears in the cation. Suitable compounds for ion exchange from aqueous solutions include primarily the complex ammino compounds such as platinous tetramminochloride, platinic hexamminochloride, platinous tetramminohydroxide, platinic hexamminohydroxide and the like. Ordinarily, in cases where the zeolite has previously been converted from the ammonium form to a hydrogen form, it is desirable to reconvert the base to the ammonium form prior to ion exchange with platinum solutions. Operative proportions of platinum in the final catalyst range between about 0.05 and 3 weight-percent, preferably 0.2 – 1.0 percent. The catalyst is then dried at 110° – 200° C., preferably 150° C., for several hours to remove excess water.

C. Final Calcination

The final calcination is carried out at temperatures between about 1,000° and 1,600° F., preferably 1,050° – 1,400° F., for about one-half to 12 hours, normally about 1 to 4 hours, in flowing dry air. In place of air, other oxidizing or inert gases may be utilized. Suitable techniques include heating in a forced draft muffle furnace, rotary kiln or the like. The heatup to operative calcination temperatures should be rather gradual so as to effect drying and deammoniation mainly at temperatures below 1,000° F. At least about the final half-hour of calcination should be carried out using influent gas having a dew point below about 0° C., and with gas circulation rates of at least about 20 scf per cubic foot of catalyst per minute. The weight loss on ignition (L.O.I.) at 2,000° F. of the final calcined catalyst should be less than about 4 weight-percent, preferably between about 0.5 and 3 weight-percent.

D. Hydrogenation Conditions and Feeds

The selection of appropriate hydrogenation conditions depends to a large extent upon the nature of the feedstock, the degree of hydrogenation required, and the degree of cracking which can be tolerated. A great many economic factors also enter into the selection of appropriate conditions. Thus for example, the choice of high pressure versus low pressure operations may depend to some extent on the economic balance of catalyst cost versus high-pressure reactor costs. In view of the wide range of process objectives and economic variables, the range of operative process conditions is very broad, as indicated in the following table:

Hydrogenation Conditions

|  | Broad Range | Preferred Range |
|---|---|---|
| Temperature, °F. | 250–600 | 300–500 |
| Pressure, psig | 150–2000 | 250–1000 |
| LHSV | 0.5–50 | 1.5–20 |
| $H_2$/Oil Ratio, MSCF/B | 0.5–10 | 1–5 |

For feedstocks boiling below about 200° F., the cracking activity of the catalysts generally does not become significant until temperatures in excess of about 500° F. are reached, but for higher boiling feedstocks cracking may become significant at temperatures as low as about 450° F. In other respects, those skilled in the art will understand that the selection of appropriate combinations of operating conditions depends upon the many variables of feedstock, objectives, and cost factors noted above. These considerations form no essential part of the present invention, and being readily determinable by routine engineering calculations, need not be described here in detail.

Feedstocks which may advantageously be hydrogenated herein include substantially any individual aromatic hydrocarbon, mixtures thereof, or mineral oil fractions boiling in the range of about 100° – 1,000° F. Benzene may be converted to cyclohexane, and toluene to methylcyclohexane. The process is especially advantageous for hydrogenating monocyclic aromatics which, as is well known, are more difficult to hydrogenate than polycyclic aromatics. Suitable feedstocks include mineral oil fractions boiling in the solvent naphtha range, turbine fuels, diesel fuels, etc. which normally contain from about 5 – 60 volume-percent of aromatic hydrocarbons. A preferred class of feedstocks consists of $C_6$ gasoline fractions, or the $C_5$-$C_6$ fractions, containing about 2–6 weight-percent of benzene. In respect to the latter type of feedstock, it is normally desirable to reduce the benzene content to less than about 10 ppm to prepare a suitable isomerization feed.

Another advantageous feature of the catalysts of this invention is their increased tolerance to sulfur. As is well known, most platinum catalysts are poisoned by sulfur compounds, but it is found that the present catalysts can be advantageously utilized to hydrogenate feeds containing from 10–100 ppm of sulfur or more. However, in the lower range of hydrogenation temperatures, i.e., below about 450° F., it is normally preferable to utilize feedstocks containing less than about 10 ppm of sulfur.

The following examples are cited to illustrate the critical aspects of the invention, but are not to be construed as limiting in scope:

EXAMPLE I — Catalyst Preparations

A preferred catalyst (designated catalyst A) of the present invention was prepared as follows:

An ammonium Y zeolite containing 1.6 weight-percent $Na_2O$ was first calcined in a closed vessel (to retain the generated steam atmosphere) at 1,012° F. in a preheated oven, then exchanged twice with a 20 percent ammonium sulfate solution, and finally recalcined in the same manner at 1,300° F. for 3 hours. The final sodium content was 0.093 weight-percent as $Na_2O$. Platinum was then exchanged into the stabilized zeolite from an aqueous solution of platinic hexamminochloride to provide 0.5 weight-percent platinum based on the zeolite. The resulting material was then mulled with peptized alpha alumina monohydrate (Boehmite) and then extruded through a one-sixteenth-inch die. The final catalyst contained 80 weight-percent Y zeolite and 0.39 weight-percent Pt. The unit cell size was 24.359 A. Half of this batch of catalyst was then subjected to a final calcination at 1,200° F. in flowing dry air for 1½ hours to give a product having an L.O.I. of 1.87 weight-percent.

A second portion of the platinum-exchanged zeolite was subjected to a final calcination for two hours at 1,020° F. in flowing dry air to give a catalyst (designated B) having a relatively higher ratio of Bronsted-/Lewis acidity, as indicated by an L.O.I. of 3.08 weight-percent.

Catalyst C, used for comparison purposes, was prepared by ion exchanging an alumina-silica cogel base containing about 25 weight-percent $SiO_2$ with a solution of platinic hexamminohydroxide, to incorporate therein 0.55 weight-percent Pt. The final catalyst was reduced in hydrogen for 2 hours at 850° F.

Comparison catalyst D was a commercial reforming catalyst comprising 0.38 weight-percent of Pt supported on a mixed etagamma alumina base.

EXAMPLE II — Activity Testing

The catalysts of Example I were tested for hydrogenation activity, using as the feedstock a hydrocracked gasoline fraction consisting primarily of pentanes and hexanes, and having a gravity of 72.1° API and a benzene concentration of 4.7 weight-percent (47,000 ppm). The feedstock was processed by passing it through beds of the respective catalysts at 360° F., 380 psig with 2,600 scf/b of hydrogen. In view of the drastic differences in activities of the respective catalysts it was necessary to carry out the various runs at different space velocities, and then calculate first order rate constants, $k$, from the equation: $k = LHSV \ln A_f/A_p$, where $A_f$ is weight-percent aromatics in the feedstock and $A_p$ is aromatics in the product. Analysis of the products from the various runs gave the following results:

TABLE 1

| Catalyst | Hours On Stream | LHSV | Unconverted Benzene, ppm | Rate Constant, k |
|---|---|---|---|---|
| A | 180 | 16 | 180 | 88.2 |
| B | 180 | 8 | 200 | 43.2 |
| C | 180 | 4.2 | 300 | 20 |
| D | 180 | 4 | 15,000 | 4.6 |

It is readily apparent from the foregoing that catalyst A (calcined at 1,200° F.) is more than twice as active as Catalyst B (calcined at 1,020° F.), and is about four to 20 times as active as the more conventional hydrogenation catalysts C and D. Cracking was negligible in all the runs.

It is not intended that the invention should be limited to non-essential details described above; the following claims and their obvious equivalents are intended to define the true scope of the invention:

I claim:

1. A method for the hydrogenation of aromatic hydrocarbons in a hydrocarbon feedstock which comprises contacting said feedstock plus added hydrogen and under hydrogenation conditions with a catalyst comprising a minor proportion of platinum impregnated and/or ion-exchanged onto a stabilized Y zeolite base containing less than about 3 weight-percent $Na_2O$ and wherein at least about 20 percent of the ion exchange sites are decationized and/or satisfied by hydrogen ions, and wherein the catalyst composition, following the addition of platinum, has been calcined at a temperature above about 1,100° F. in a substantially dry atmosphere to give a final composition having a loss on ignition of less than about 4 weight-percent.

2. A hydrogenation process as defined in claim 1 wherein said Y zeolite is stabilized by incorporating therein zeolitic polyvalent metal cations.

3. A hydrogenation process as defined in claim 1 wherein said Y zeolite is at least about 80% in the decationized and/or hydrogen form, and has been stabilized by calcining in a steam atmosphere at temperatures between about 900° and 1,500° F., prior to the addition of platinum.

4. A process for the hydrogenation of benzene in a hydrocarbon feedstock composed mainly of $C_6$ or $C_5$-$C_6$ hydrocarbons, which comprises contacting said feedstock plus added hydrogen and under hydrogenation conditions with a catalyst comprising a minor proportion of platinum dispersed by ion exchange onto a stabilized hydrogen and/or decationized Y zeolite containing less than about 1.5 weight-percent of $Na_2O$, said catalyst having been prepared by subjecting an ammonium Y zeolite in which at least about 50 percent of the original zeolitic sodium has been replaced with ammonium ions to hydrothermal stabilization by heating in the presence of steam at a temperature between about 900° and 1,500° F. for a sufficient time to reduce the unit cell size to between about 24.20 and 24.55 A, then exchanging said platinum into the resulting stabilized zeolite, and finally calcining the platinum-containing catalyst at a temperature between about 1,100° and 1,600° F. in a substantially dry atmosphere for a sufficient time to reduce its loss on ignition to below about 4 weight-percent.

5. A hydrogenation process as defined in claim 4 wherein said hydrothermal stabilization treatment comprises at least two steam calcination steps at temperatures between about 900° and 1,500° F., with an intervening ammonium ion exchange treatment to reduce the final sodium content to below about 0.5 weight-percent $Na_2O$ and give a unit cell size between about 24.30 and 24.50 A.

* * * * *